United States Patent
Lin et al.

(10) Patent No.: US 9,632,632 B2
(45) Date of Patent: Apr. 25, 2017

(54) TOUCH MODULE AND METHOD OF FABRICATING THE SAME

(71) Applicant: Top Victory Investments Ltd., Kowloon (HK)

(72) Inventors: Wei-Ting Lin, New Taipei (TW); Yung-Shin Liou, New Taipei (TW)

(73) Assignee: Top Victory Investments Ltd., Kowloon (HK)

( * ) Notice: Subject to any disclaimer, the term of this patent is extended or adjusted under 35 U.S.C. 154(b) by 418 days.

(21) Appl. No.: 14/296,571

(22) Filed: Jun. 5, 2014

(65) Prior Publication Data
US 2015/0355745 A1    Dec. 10, 2015

(51) Int. Cl.
| | |
|---|---|
| *G06F 3/044* | (2006.01) |
| *C25D 7/00* | (2006.01) |
| *C25D 3/12* | (2006.01) |
| *C25D 3/38* | (2006.01) |
| *C25D 5/02* | (2006.01) |

(52) U.S. Cl.
CPC .............. *G06F 3/044* (2013.01); *C25D 7/00* (2013.01); *C25D 3/12* (2013.01); *C25D 3/38* (2013.01); *C25D 5/022* (2013.01); *G06F 2203/04103* (2013.01)

(58) Field of Classification Search
CPC . G06F 3/044; G06F 2203/04103; C25D 7/00; C25D 3/12; C25D 3/38; C25D 5/022
See application file for complete search history.

(56) References Cited

U.S. PATENT DOCUMENTS

| | | | | |
|---|---|---|---|---|
| 8,643,612 B2* | 2/2014 | Yang | ..................... | G06F 3/0414 257/414 |
| 2012/0073947 A1* | 3/2012 | Sakata | ..................... | G06F 3/044 200/600 |
| 2013/0140074 A1* | 6/2013 | Yang | ..................... | H05K 1/115 174/266 |
| 2015/0056383 A1* | 2/2015 | Pedrosa | ................. | H05K 1/097 427/556 |
| 2015/0145807 A1* | 5/2015 | Wang | ..................... | G06F 3/044 345/174 |

* cited by examiner

*Primary Examiner* — Liliana Cerullo
(74) *Attorney, Agent, or Firm* — Alan D. Kamrath; Kamrath IP Lawfirm, P.A.

(57) ABSTRACT

The present invention relates to a touch module and a method of fabricating the touch module. The method comprises: providing a substrate plate, applying an adhesive layer on the substrate plate, forming a sensing line trough and a peripheral line trough on the adhesive layer, forming a first conductive layer in the sensing line trough and a second conductive layer in the peripheral line trough, wherein the first conductive layer in the sensing line trough serves as a sensing line, covering an anti acid film on the sensing line trough, electroplating an electroplated layer on the second conductive layer in the peripheral line trough, wherein the electroplated layer plus the second conductive layer serve as a peripheral line, and removing the anti acid film. Comparing to the prior art, the invention reduces the width of the peripheral line, lowers the resistance of the peripheral line, and improves yield rate.

18 Claims, 4 Drawing Sheets

TOUCH MODULE AND METHOD OF FABRICATING THE SAME

BACKGROUND OF THE INVENTION

1. Field of the Invention

The present invention relates to a touch module, and more particularly, to a touch module and a method of fabricating the same.

2. Description of the Prior Art

Display devices with touch panels are getting popular in recent years. Most of touch panels adopt indium tin oxide (ITO) transparent conductive films to form sensing components. However, resistances of the ITO transparent conductive films are too high to serve as sensing components of touch panels of medium or large sizes. Metal mesh, on the other hand, has lower resistances comparing to the ITO films. Such that metal mesh is a better choice to serve as sensing components of touch panels of medium or large sizes.

The touch panel includes a substrate plate and sensing components formed on the substrate plate. A surface of the substrate plate can be defined as a sensing area and a lining area around the sensing area. The sensing components include a sensing line located at the sensing area and a peripheral line located at the lining area. The sensing line is utilized for sensing touches of object. The peripheral line is utilized for receiving signals from the sensing line and transmitting the signals to a sensor to process. There are two methods of fabricating the sensing line and the peripheral line. The first method is to form a physical line on the substrate plate by processes of metal coating and photolithography. The first method has higher cost. The second method comprises: applying an adhesive film on the substrate plate, impressing troughs of patterns relating to the sensing line and the peripheral line on the adhesive film, filling a silver paste in the troughs, and baking it at high temperature. The cured silver paste will form a conductive layer. The conductive layer serves as the sensing line and the peripheral line. The second method has lower cost but also has some drawbacks. For example, a width of the peripheral line needs to be increased to reduce resistance. As a result, an area of the touch panel increases, and that is a disadvantage with regard to the design of narrow bezel. In addition, the peripheral line has to form a grid structure by mesh to fit the sensing line of the sensing area. For safety, the peripheral line needs to include at least four intersections align with a direction along a width of the lining area to prevent the peripheral line from breakage; therefore, the width of the lining area cannot be reduced. The silver paste filled in the troughs is uneven because a width of troughs relating to the peripheral line is different from that relating to the sensing line, and that lead to possibilities of breakage and reduction of yield rate.

SUMMARY OF THE INVENTION

According to the disadvantage of the prior art, the present invention aims to provide a touch module and a method of fabricating the same, so as to reduce the width of a peripheral line, lower the resistance of the peripheral line, and improve yield rate.

According to the claimed invention, the method of fabricating the touch module comprises: providing a substrate plate, applying an adhesive layer on the substrate plate, forming a sensing line trough and a peripheral line trough on the adhesive layer, forming a first conductive layer in the sensing line trough and a second conductive layer in the peripheral line trough, wherein the first conductive layer in the sensing line trough serves as a sensing line, covering an anti acid film on the sensing line trough, electroplating an electroplated layer on the second conductive layer in the peripheral line trough, wherein the electroplated layer plus the second conductive layer serve as a peripheral line, and removing the anti acid film.

According to an embodiment of the claimed invention, the peripheral line trough is a non-grid structure According to another embodiment of the claimed invention, a width of the peripheral line trough is greater than that of the sensing line trough, a thickness of the first conductive layer is equal to a depth of the sensing line trough, and a thickness of the second conductive layer is less than a depth of the peripheral line trough.

According to another embodiment of the claimed invention, the sensing line trough intersects to form a grid structure.

According to another embodiment of the claimed invention, the step of forming the sensing line trough and the peripheral line trough on the adhesive layer further comprises: impressing the adhesive layer by a mold to form the sensing line trough and the peripheral line trough on the adhesive layer, and exposing the adhesive layer to ultraviolet light source to cure the adhesive layer.

According to another embodiment of the claimed invention, the step of forming the first conductive layer in the sensing line trough and the second conductive layer in the peripheral line trough further comprises: applying a silver paste or an aluminum paste in the sensing line trough and the peripheral line trough, and then curing the silver paste or the aluminum paste.

According to another embodiment of the claimed invention, the step of electroplating the electroplated layer on the second conductive layer in the peripheral line trough further comprises: immersing the substrate plate covered with the anti acid film in plating solution.

According to the claimed invention, the touch module comprises: a substrate plate, an adhesive layer, a sensing line trough, a peripheral line trough, a first conductive layer, a second conductive layer, and an electroplated layer. The adhesive layer is attached to the substrate plate. The sensing line trough is formed on the adhesive layer. The peripheral line trough is formed on the adhesive layer and is located at a peripheral area of the sensing line trough. The first conductive layer is attached in the sensing line trough. The second conductive layer is attached in the peripheral line trough. The electroplated layer is attached on the second conductive layer in the peripheral line trough. Wherein the first conductive layer serves as a sensing line, the second conductive layer plus the electroplated layer serve as a peripheral line.

According to an embodiment of the claimed invention, a width of the peripheral line trough is between 10 to 40 micrometers, a width of the sensing line trough is less than 5 micrometers, and the width of the peripheral line trough is greater than that of the sensing line trough.

According to another embodiment of the claimed invention, a thickness of the first conductive layer is equal to a depth of the sensing line trough, and a thickness of the second conductive layer is less than a depth of the peripheral line trough.

According to another embodiment of the claimed invention, the adhesive layer comprises ultraviolet curing adhesives.

According to another embodiment of the claimed invention, the first and the second conductive layers comprise silver or aluminum.

According to another embodiment of the claimed invention, the electroplated layer comprises copper or nickel.

The touch module and the method of fabricating the same can reduce the width of the peripheral line, lower the resistance of the peripheral line, and improve yield rate.

These and other objectives of the present invention will no doubt become obvious to those of ordinary skill in the art after reading the following detailed description of the preferred embodiment that is illustrated in the various figures and drawings.

DETAILED DESCRIPTION

Figure 8:
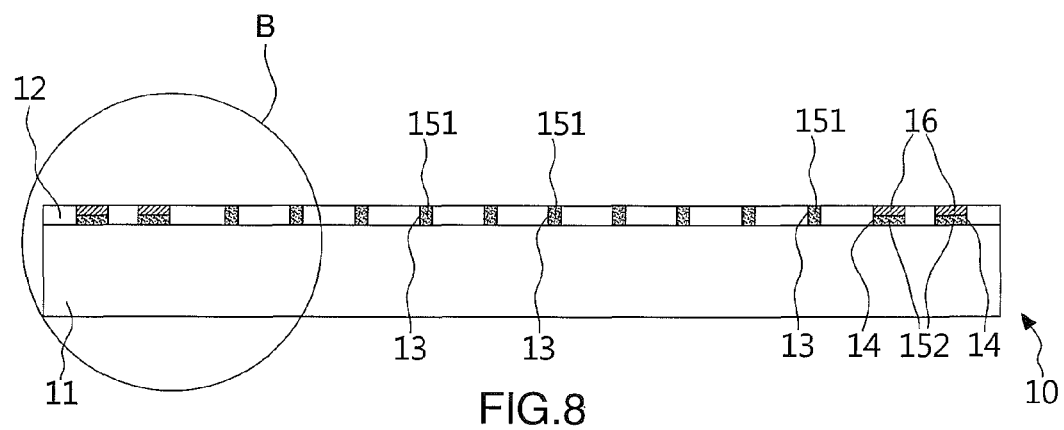
FIG. 8 is a diagram of the touch module according to the preferred embodiment of the present invention.
Figure 9:
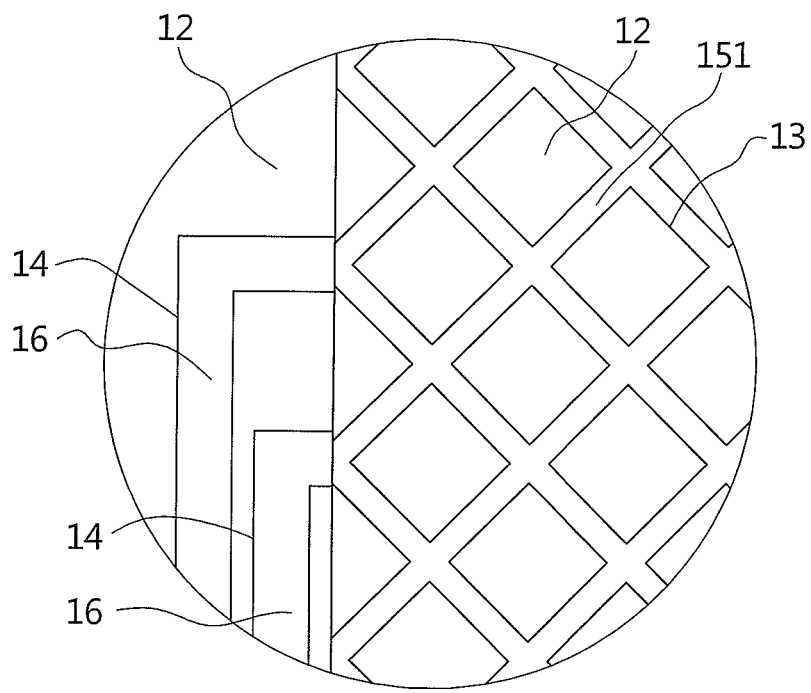
FIG. 9 is a top view of a partial area of a sensing line and a peripheral line according to the preferred embodiment of the present invention.
Figure 10:
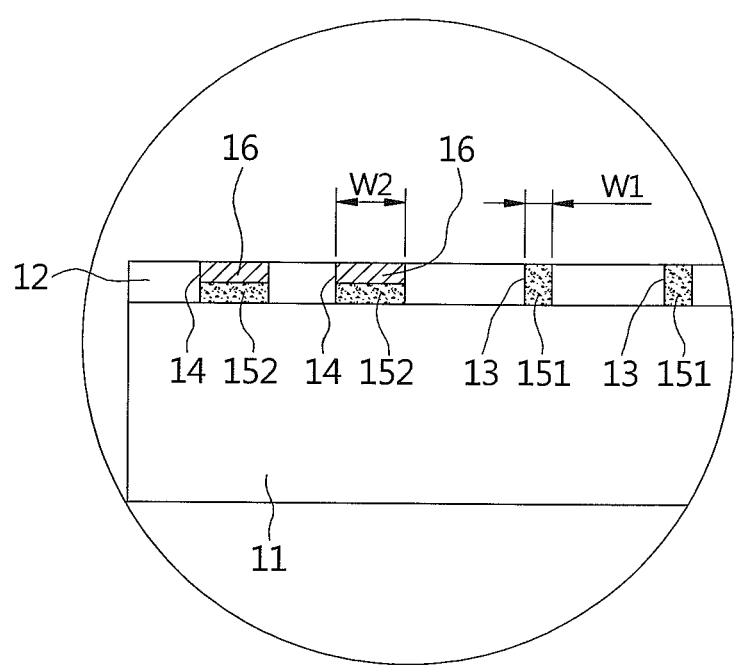
FIG. 10 is an enlarged diagram of an area "B" of FIG. 8.

Please refer to FIG. 8. FIG. 8 illustrates a touch module 10 according to a preferred embodiment of the present invention. The touch module 10 comprises a substrate plate 11, an adhesive layer 12, a sensing line trough 13, a peripheral line trough 14, a first conductive layer 151, a second conductive layer 152, and an electroplated layer 16. The adhesive layer 12 is attached to the substrate plate 11. In the embodiment, the substrate plate 11 is polyester (PET) film. The adhesive layer 12 comprises ultraviolet curing adhesives. In other embodiments, the substrate plate can be a glass. The sensing line trough 13 and the peripheral line trough 14 are both formed on the adhesive layer 12. The peripheral line trough 14 is located at a peripheral area of the sensing line trough 13. The first conductive layer 151 is attached in the sensing line trough 13. The second conductive layer 152 is attached in the peripheral line trough 14. The first and the second conductive layers 151, 152 comprise silver. The electroplated layer 16 is attached on the second conductive layer 152 in the peripheral line trough 14. The electroplated layer 16 comprises copper. In other embodiments, the first and the second conductive layers can comprise aluminum. The electroplated layer can comprise nickel or other metal having good conductivity. The first conductive layer 151 in the sensing line trough 13 serves as a sensing line of the touch module 10. The second conductive layer 152 plus the electroplated layer 16 in the peripheral line trough 14 serve as a peripheral line of the touch module 10. The sensing line is electrically connected to the peripheral line. When fingers touch or extremely approach the sensing line, the sensing line can sense the touch or the approach of the fingers and positions thereof, and the peripheral line can receive signals from the sensing line and then transmit them to a sensor (not shown in figures) for further processing. Please refer to FIG. 9 and FIG. 10. FIG. 9 illustrates a top view of a partial area of the sensing line and the peripheral line according to the preferred embodiment of the present invention. FIG. 10 illustrates an enlarged diagram of an area "B" of FIG. 8. The sensing line trough 13 intersects on the adhesive layer 12 to form a grid structure, and the sensing line (i.e. the first conductive layer 151 in the sensing line trough 13) correspondingly forms a grid structure, like a mental mesh, as shown in FIG. 9. The sensing line can have a single layer or a double layer (which comprises two layers). In the embodiment, as shown in FIG. 10, a width W1 of the sensing line trough 13, which is equal to a width of the sensing line, is 4 micrometers, a width W2 of the peripheral line trough 14, which is equal to a width of the peripheral line, is 15 micrometers, the width W2 of the peripheral line trough 14 is greater than the width W1 of the sensing line trough 13, and a depth of the peripheral line trough 14 is equal to that of the sensing line trough 13. As shown in FIG. 9, the peripheral line trough 14 is a non-grid structure, and the peripheral line correspondingly forms a non-grid structure. In other words, the peripheral line forms a physical line with straight line structure. As a result, the width of the peripheral line can be further reduced, and the resistance thereof can be lowered. In other embodiments, the width of the peripheral line trough can be between 10 to 40 micrometers, and the width of the sensing line trough can be less than 5 micrometers. A thickness of the second conductive layer 152 is less than the depth of the peripheral line trough 14. The second conductive layer 152 is thinner than the first conductive layer 151. A thickness of the second conductive layer 152 plus the electroplated layer 16 is equal to a thickness of the first conductive layer 151.

Figure 1:
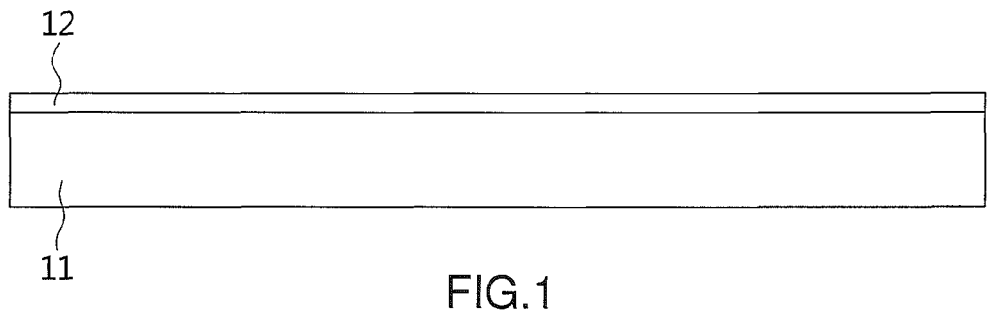
FIG. 1 is a diagram of the first step of a method of fabricating a touch module according to a preferred embodiment of the present invention.
Figure 2:
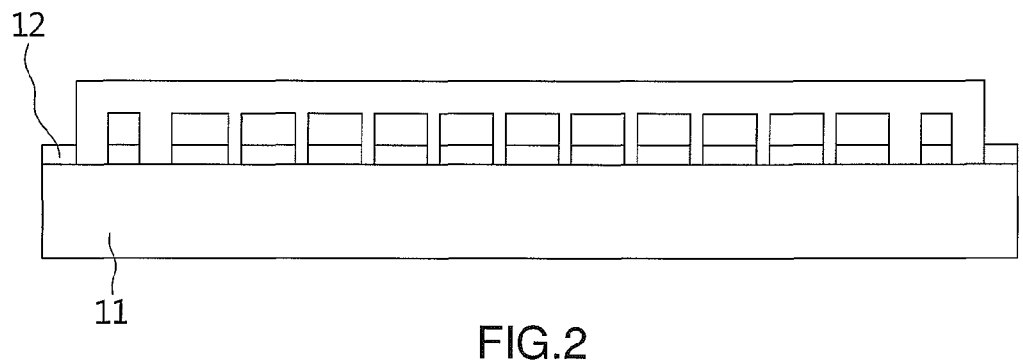
FIG. 2 is a diagram of the second step of the method of fabricating the touch module according to the preferred embodiment of the present invention.
Figure 3:
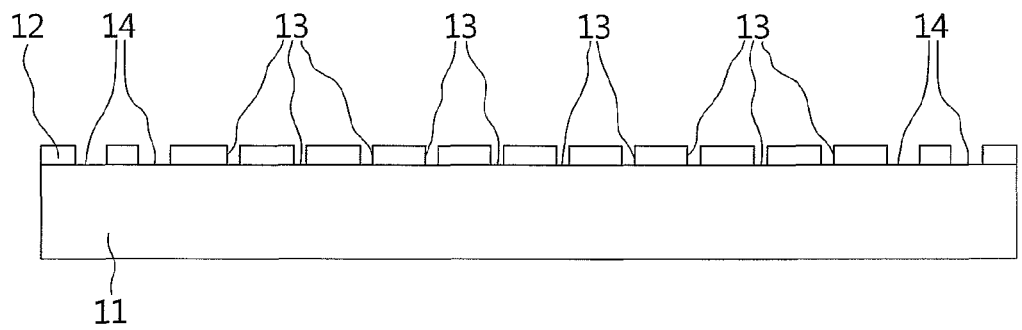
FIG. 3 is a diagram of the third step of the method of fabricating the touch module according to the preferred embodiment of the present invention.
Figure 4:
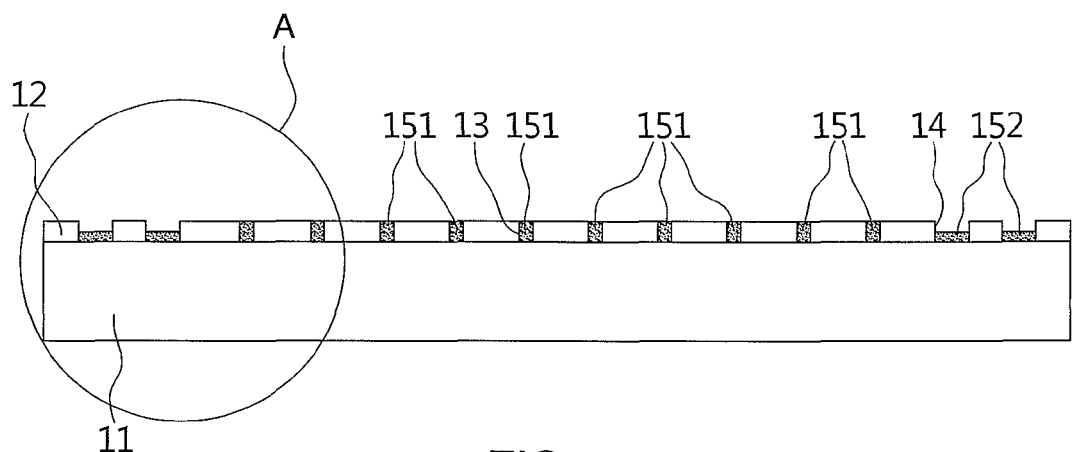
FIG. 4 is a diagram of the fourth step of the method of fabricating the touch module according to the preferred embodiment of the present invention.
Figure 5:
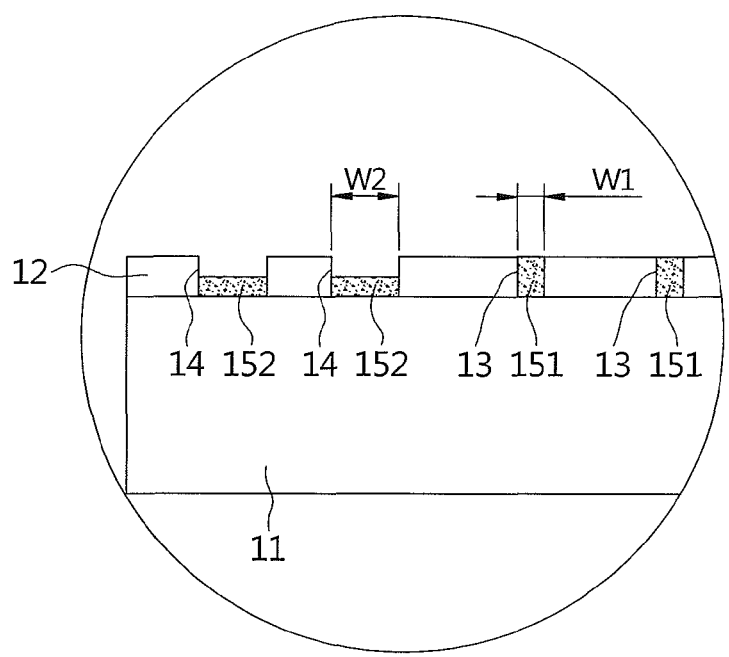
FIG. 5 is an enlarged diagram of an area "A" of FIG. 4.

Please refer to FIG. 1 to FIG. 8. FIG. 1 to FIG. 4, FIG. 6, and FIG. 7 sequentially illustrate the steps of a method of fabricating the touch module 10 according to the preferred embodiment of the present invention. FIG. 5 illustrates an enlarged diagram of an area "A" of FIG. 4. As shown in FIG. 1, first step is to prepare the PET film which will be utilized for the substrate plate 11. Next steps are to age (pre-shrink) the PET film to make extensibility thereof fixed, which is beneficial for stability of further process, to apply ultraviolet curing adhesives on a surface of the substrate plate 11 to form the adhesive layer 12, to impress the adhesive layer 12 by a metal mold (as shown in FIG. 2) to form the sensing line trough 13 and the peripheral line trough 14 on the adhesive layer 12, and then to expose the adhesive layer 12 to ultraviolet light source to cure the adhesive layer 12. After demolding, as shown in FIG. 3, the sensing line trough 13 and the peripheral line trough 14 have been formed on the adhesive layer 12. Wherein, the process of applying the adhesive layer 12 on the substrate plate 11 and impressing the adhesive layer 12 by the metal mold can adopt a roll to roll process.

As shown in FIG. 4, after the sensing line trough 13 and the peripheral line trough 14 were formed, next step is to form the first conductive layer 151 in the sensing line trough 13 and to form the second conductive layer 152 in the peripheral line trough 14. In the embodiment, a method of forming the first and the second conductive layers 151, 152 is to apply a silver paste to flow into the sensing line trough 13 and the peripheral line trough 14 having been formed on the adhesive layer 12. An amount of the silver paste needed to be filled is based on the sensing line trough 13, that is, to stop applying the silver paste when the sensing line trough 13 is just filled with the silver paste. Next steps are to have residual silver paste be scraped off the surface of the adhesive layer 12, and to bake the silver paste at high temperature to cure and form the first and the second conductive layers 151, 152. As shown in FIG. 5. The thickness of the first conductive layer 151 is equal to the depth of the sensing line trough 13, but the thickness of the second conductive layer 152 is less than the depth of the peripheral line trough 14 because that the width W2 of the peripheral line trough 14 is greater than the width W1 of the sensing line trough 13; therefore, the second conductive layer 152 is thinner than the first conductive layer 151. In other embodiments, the silver paste can be replaced by an aluminum paste.

Figure 6:
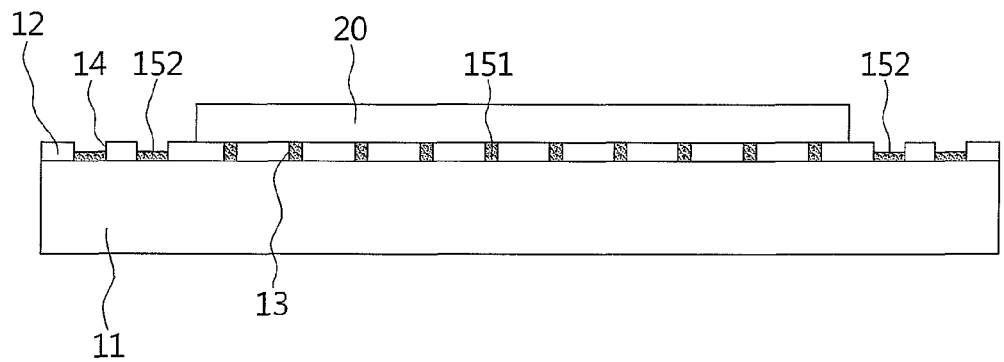
FIG. 6 is a diagram of the fifth step of the method of fabricating the touch module according to the preferred embodiment of the present invention.
Figure 7:
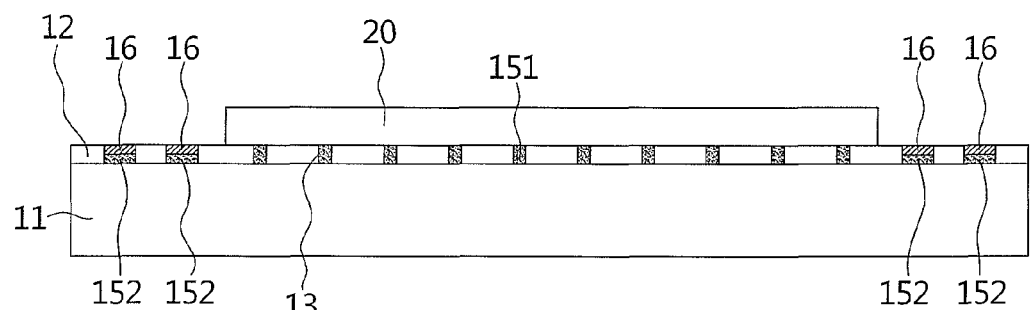
FIG. 7 is a diagram of the sixth step of the method of fabricating the touch module according to the preferred embodiment of the present invention.

As shown in FIG. 6, after the first and the second conductive layers. 151, 152 were cured and formed, next step is to cover an anti acid film 20 on the sensing line trough 13 and the first conductive layer 151 therein. Only the peripheral line trough 14 and the second conductive layer 152 therein are exposed. Next step is to immerse the substrate plate 11 covered with the anti acid film 20 in plating solution (not shown in figures). In the embodiment, plating solution comprises copper ions. In other embodiments, plating solution can comprise nickel ions or other metal ions having good conductivity to replace copper ions. Next step is to electroplate, as shown in FIG. 7. During electroplating process, the electroplated layer 16 is electroplated on the second conductive layer 152, which serves as an initial layer of electroplating, in the peripheral line trough 14. A thickness of the peripheral line is equal to the thickness of the second conductive layer 152 plus the electroplated layer 16. As a result, the resistance of the peripheral line can be lowered. After electroplating process was performed, next step is to remove the anti acid film 20. As shown in FIG. 8, the process of fabricating the touch module 10 completes.

The invention which provides the touch module and the method of fabricating the same can lower the resistance of the peripheral line in the condition that the width of the peripheral line has no need to be increased. The thickness of the second conductive layer plus the electroplated layer is equal to the thickness of the first conductive layer; therefore, the thicknesses of the sensing line and the peripheral line are even, such that possibilities of breakage are lowered and yield rate is increased. The touch module of the present invention can reduce the width of the peripheral line and is more suitable for applying to touch display devices having narrow bezels.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A method of fabricating a touch module comprising:
providing a substrate plate;
applying an adhesive layer on the substrate plate;
forming a sensing line trough and a peripheral line trough on the adhesive layer;
forming a first conductive layer in the sensing line trough and a second conductive layer in the peripheral line trough, wherein the first conductive layer in the sensing line trough serves as a sensing line;
covering an anti acid film on the sensing line trough;
electroplating an electroplated layer on the second conductive layer in the peripheral line trough, wherein the electroplated layer plus the second conductive layer serve as a peripheral line; and
removing the anti acid film.

2. The method of fabricating the touch module of claim 1, wherein the peripheral line trough is a non-grid structure.

3. The method of fabricating the touch module of claim 2, wherein a width of the peripheral line trough is greater than that of the sensing line trough, a thickness of the first conductive layer is equal to a depth of the sensing line trough, and a thickness of the second conductive layer is less than a depth of the peripheral line trough.

4. The method of fabricating the touch module of claim 2, wherein the sensing line trough intersects to form a grid structure.

5. The method of fabricating the touch module of claim 1, wherein the step of forming the sensing line trough and the peripheral line trough on the adhesive layer further comprises: impressing the adhesive layer by a mold to form the sensing line trough and the peripheral line trough on the adhesive layer, and exposing the adhesive layer to ultraviolet light source to cure the adhesive layer.

6. The method of fabricating the touch module of claim 1, wherein the step of forming the first conductive layer in the sensing line trough and the second conductive layer in the peripheral line trough further comprises: applying a silver paste in the sensing line trough and the peripheral line trough, and then curing the silver paste.

7. The method of fabricating the touch module of claim 1, wherein the step of forming the first conductive layer in the sensing line trough and the second conductive layer in the peripheral line trough further comprises: applying an aluminum paste in the sensing line trough and the peripheral line trough, and then curing the aluminum paste.

8. The method of fabricating the touch module of claim 1, wherein the step of electroplating the electroplated layer on the second conductive layer in the peripheral line trough further comprises: immersing the substrate plate covered with the anti acid film in plating solution.

9. A touch module comprising:
a substrate plate;
an adhesive layer attached to the substrate plate;
a sensing line trough formed on the adhesive layer;
a peripheral line trough formed on the adhesive layer and located at a peripheral area of the sensing line trough;
a first conductive layer attached in the sensing line trough;
a second conductive layer attached in the peripheral line trough; and
an electroplated layer attached on the second conductive layer in the peripheral line trough, wherein the first conductive layer serves as a sensing line, and the second conductive layer plus the electroplated layer serve as a peripheral line
wherein the electroplated layer is attached on the second conductive layer by covering an anti acid film on the sensing line trough, electroplating an electroplated layer on the second conductive layer in the peripheral line trough, and removing the anti acid film.

10. The touch module of claim 9, wherein a width of the peripheral line trough is between 10 to 40 micrometers, a width of the sensing line trough is less than 5 micrometers, and the width of the peripheral line trough is greater than that of the sensing line trough.

11. The touch module of claim 9, wherein a thickness of the first conductive layer is equal to a depth of the sensing line trough, and a thickness of the second conductive layer is less than a depth of the peripheral line trough.

12. The touch module of claim 9, wherein the peripheral line trough is a non-grid structure.

13. The touch module of claim 12, wherein the sensing line trough intersects to form a grid structure.

14. The touch module of claim 9, wherein the adhesive layer comprises ultraviolet curing adhesives.

15. The touch module of claim 9, wherein the first and the second conductive layers comprise silver.

16. The touch module of claim 9, wherein the first and the second conductive layers comprise aluminum.

17. The touch module of claim 9, wherein the electroplated layer comprises copper.

18. The touch module of claim 9, wherein the electroplated layer comprises nickel.

* * * * *